United States Patent
Berger et al.

(10) Patent No.: US 7,051,436 B2
(45) Date of Patent: May 30, 2006

(54) METHOD OF DISTRIBUTING ROTOR BLADES IN A TURBOMACHINE

(75) Inventors: Daniel Berger, La Chapelle Rablais (FR); Jean-Louis Tranchier, Nandy (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/612,932

(22) Filed: Jul. 7, 2003

(65) Prior Publication Data

US 2004/0013523 A1    Jan. 22, 2004

(30) Foreign Application Priority Data

Jul. 17, 2002    (FR)    ................................. 02 09027

(51) Int. Cl.
*B21K 25/00*    (2006.01)

(52) U.S. Cl. .................................. 29/889.21; 29/889.2

(58) Field of Classification Search ............. 29/889.21, 29/889.2, 889, 407.01, 407.05, 407.08, 445; 416/61, 214 A, 215

See application file for complete search history.

(56) References Cited

U.S. PATENT DOCUMENTS 4,767,272 A    8/1988    Kildea

FOREIGN PATENT DOCUMENTS

| GB | 2185116 A | * | 7/1987 |
| GB | 2 245 661 A | | 1/1992 |
| SU | 1157375 | * | 5/1985 |
| SU | 1239535 | * | 6/1986 |
| SU | 858429 | * | 2/1996 |

* cited by examiner

*Primary Examiner*—John C. Hong
(74) *Attorney, Agent, or Firm*—Oblon, Spivak, McClelland, Maier & Neustadt, P.C.

(57) ABSTRACT

A method of distributing the blades of a turbomachine rotor in which the radial and tangential static moments of a plurality of blades for making a rotor are initially measured, and then the blades are classified in pairs on the basis of a determined selection criterion depending on said previously measured two static moments, and finally the blades of the selected pairs are mounted one by one on the rotor in diametrically opposite positions. It is also possible to measure the axial static moment of the blades, with the classification in pairs then being performed while taking account also of the axial static moment as measured in this way.

9 Claims, 5 Drawing Sheets

METHOD OF DISTRIBUTING ROTOR BLADES IN A TURBOMACHINE

FIELD OF THE INVENTION

The present invention relates to the general field of rotors for fans, compressors, or turbines in turbomachines, and more particularly it relates to a method of distributing the blades of turbomachine rotors.

PRIOR ART

The way in which the blades are distributed on the rotor of a turbomachine is of great importance for the behavior (balance) of such blades that move in operation. Poor distribution leads to unbalance due to the moving blades behaving differently under the same centrifugal loading. Such unbalance gives rise to high levels of vibration having a non-negligible impact on the mechanical and acoustic characteristics of the turbomachine and can, in the extreme, lead to destruction of the moving blades, of the turbomachine, and of its environment (in the field of aviation, that can be the aircraft in which the turbomachine is fitted, for example).

OBJECT AND SUMMARY OF THE INVENTION

An object of the present invention is thus to provide a method of improving the distribution of the blades of a turbomachine rotor so as to obtain better balance in operation. Another object of the invention is to propose a method of distribution which remains applicable during subsequent maintenance operations that leads to individual blades being changed.

These objects are achieved by a method of distributing the blades of a turbomachine rotor in which the radial and tangential static moments of a plurality of blades for making a rotor are initially measured, and then the blades are classified in pairs on the basis of a determined selection criterion depending on the two previously measured static moments, and finally the blades of the selected pairs are mounted one by one on the rotor in diametrically opposite positions.

Thus, by this specific method, the blades are automatically balanced regardless of their operating conditions. The residual unbalance generated by deformation of the blades is well controlled.

The selection criterion consists in determining for two given blades both a radial static moment difference and a tangential static moment difference, and in verifying that these two differences are respectively not greater than a first determined value and not greater than a second determined value. Preferably, the first and second determined values are respectively $2 \times 10^{-4}$ meter kilograms (m.kg) and $4 \times 10^{-4}$ m.kg.

Advantageously, an axial static moment of the plurality of blades is also measured, and the blades are classified in pairs while taking into account the axial static moment as measured the selection criterion consisting in determining an axial static moment difference between two blades and in verifying that this axial static moment difference is not greater than a third determined value, preferably $4 \times 10^{-4}$ m.kg.

A combined static moment of plurality of blades is also calculated and the classification in pairs may be performed while taking into account the combined static moment, the selection criterion consisting in determining the unbalance of the residual radial, tangential, and axial static moments of the plurality of blades and in verifying that this continued static moment is not greater than a fourth determined value, preferably $1 \times 10^{-4}$ m.kg.

BRIEF DESCRIPTION OF THE DRAWINGS

The characteristics and advantages of the present invention appear more clearly from the following description made by way of non-limiting indication and with reference to the accompanying drawings, in which.

DETAILED DESCRIPTION OF A PREFERRED EMBODIMENT

Figure 1:
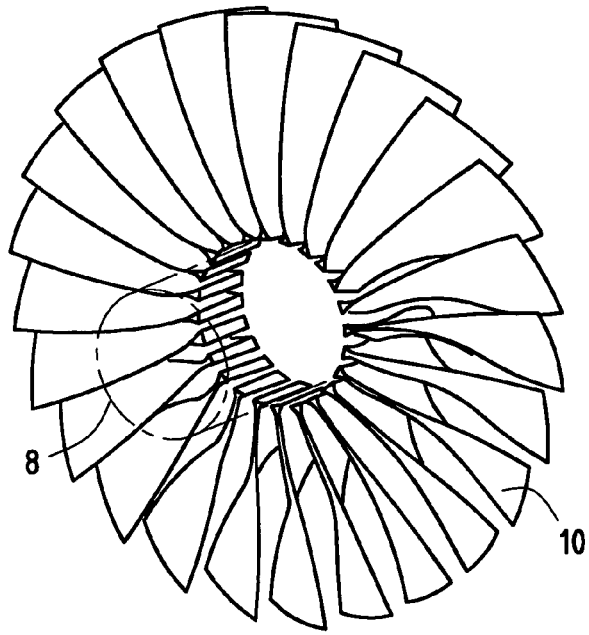
FIG. 1 shows a turbomachine rotor fitted with blades.

FIG. 1 shows a turbomachine rotor conventionally comprising a central disk 8 having a plurality of blades 10 mounted on its circumference. The number of blades is even, for example 24 blades for a fan rotor.

Figure 2:
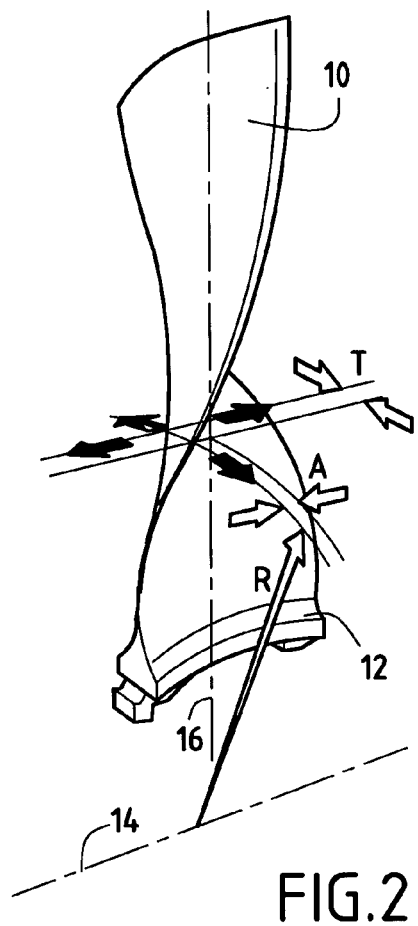
FIG. 2 is a detail view of one particular blade of the FIG. 1 rotor.
Figure 3:
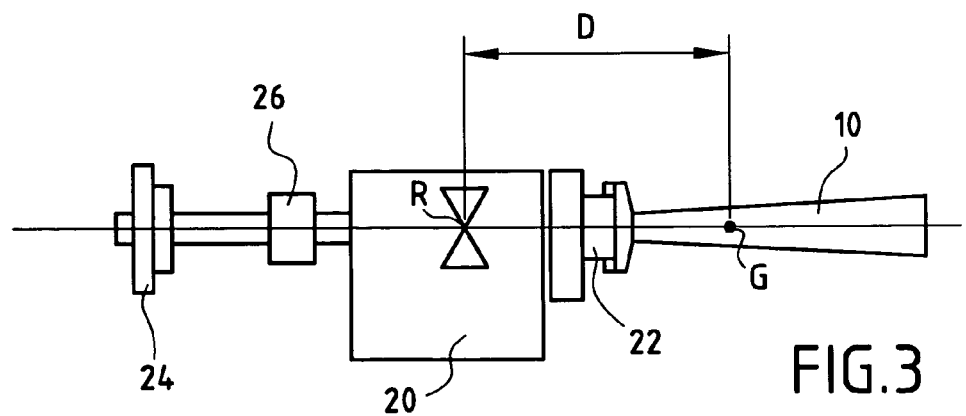
FIG. 3 is a diagrammatic view of a machine for measuring the radial static moment of the FIG. 2 blade.

FIG. 2 is a detail view of one particular blade of the rotor. This blade 10 is in the form of a twisted wing with a blade root 12, e.g. in the shape of a fir tree, so as to provide a fixed connection with the drum of the rotor. This figure also shows the axis 14 of the rotor (which is also the axis of the turbomachine), the center of gravity G of the blade, and the longitudinal axis 16 of the blade (perpendicular to the axis of the rotor and passing through G). These axes enable static moments of the blade to be defined in three dimensions. Firstly there are the radial static moment (R), secondly the tangential static moment (T), and thirdly the axial static moment (A), with the second and third components of the static moment being defined relative to the longitudinal axis 16. These three components can be measured on each blade of a rotor using suitable known machines, for example the precision balance shown in FIG. 3.

The balance 20 has been previously calibrated to measure 3D static moments and serves to measure the radial and axial static moments. To do this, the blade 10 is positioned in centrifuged operation on an engagement disk 22 which is rotated. A counterweight 24 associated with an adjustment ring 26 enables rotation to be balanced. The static moment is equal to the product of the lever arm D (defined relative to the reference R of the balance) multiplied by the mass M applied at the center of gravity G of the blade. This machine, which can also measure the tangential static moment by turning the engagement disk 22 through 90°, is well known and it is not appropriate to describe it in detail herein.

In a preferred embodiment of the invention, in order to distribute the blades of a turbomachine rotor in such a manner as to guarantee good balance in operation, a first step is to measure the radial and tangential static moments of a plurality of blades for use in making a rotor, and then the blades are classified in pairs using a determined selection criterion which depends on the measurements obtained for these two static moments, and finally the blades of selected pairs (i.e. pairs that are suitable and have therefore not been rejected) are mounted one by one on the rotor drum in diametrically opposite positions (0°–180°). In another implementation, it is also possible to measure the axial static moment of each of the blades, and the selection criterion then includes this additional measurement.

The selection criterion enabling the blades to be classified as acceptable blades and blades to be rejected is based on calculating static moment differences between two blades that are to form a pair. The idea is firstly to determine a radial static moment difference between two given blades, and secondly to determine a tangential static moment difference between the same two blades, and then to verify that these two differences are respectively not greater than a first determined value and not greater than a second determined value. Under such circumstances, the blades are considered as being suitable for mounting on the rotor that is being built, whereas otherwise they are rejected.

These two maximum difference values that determine whether or not blades are rejected are preferably equal respectively to $2\times10^{-4}$ m.kg (i.e. 200 centimeter grams (cm.g)) and $4\times10^{-4}$ m.kg (400 cm.g).

This selection criterion may naturally be extended to include the axial component of the static moment, which is then also determined for the pair of blades under analysis, the maximum difference in axial static moment beyond which the blade must be rejected then being compared with a third value that is likewise equal to $4\times10^{-4}$ m.kg (400 cm.g). Naturally, the invention is not limited to these particular predetermined limit values, and smaller values could indeed be envisaged, for example respectively 200 cm.g, 300 cm.g, and 200 cm.g, providing a higher reject rate can be accepted (or providing tighter tolerances can be applied to manufacturing the blades).

Finally, the resultant of the unbalance caused by the set of blades (the full set) once mounted on the disk can be monitored by calculating a combined static residual moment relating to said blades (i.e. radial+tangential moment or radial+tangential+axial moment), and the selection criterion can usefully be extended to take this into account. This additional selection criterion corresponds to determining the unbalance of the residual radial and tangential static moments (or radial, tangential, and axial static moments depending on the intended embodiment) for all of the blades, which residual moment should not be greater than a fourth predetermined value, preferably equal to $6\times10^{-4}$ m.kg (for radial+tangential moment) or to $1\times10^{-4}$ m.kg (for radial+tangential+axial moment) in order to ensure that the rotor as a whole is not rejected.

An example of implementing the method of the invention is shown in FIGS. 4A to 7B. This example relates to a fan rotor having a set of 24 blades (numbered 1 to 24), with the 3D static moments being measured in this example on 26 sets of 24 blades (i.e. 624 blades).

Figure 4A:
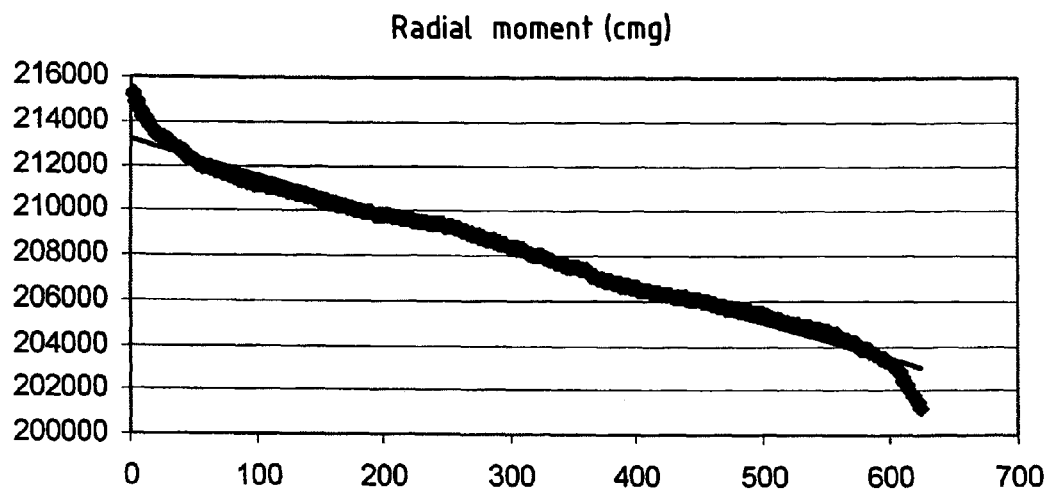
FIGS. 4A to 7B are examples of diagrams showing the distribution of the static moments of the rotor blades of FIG. 1.
Figure 4B:
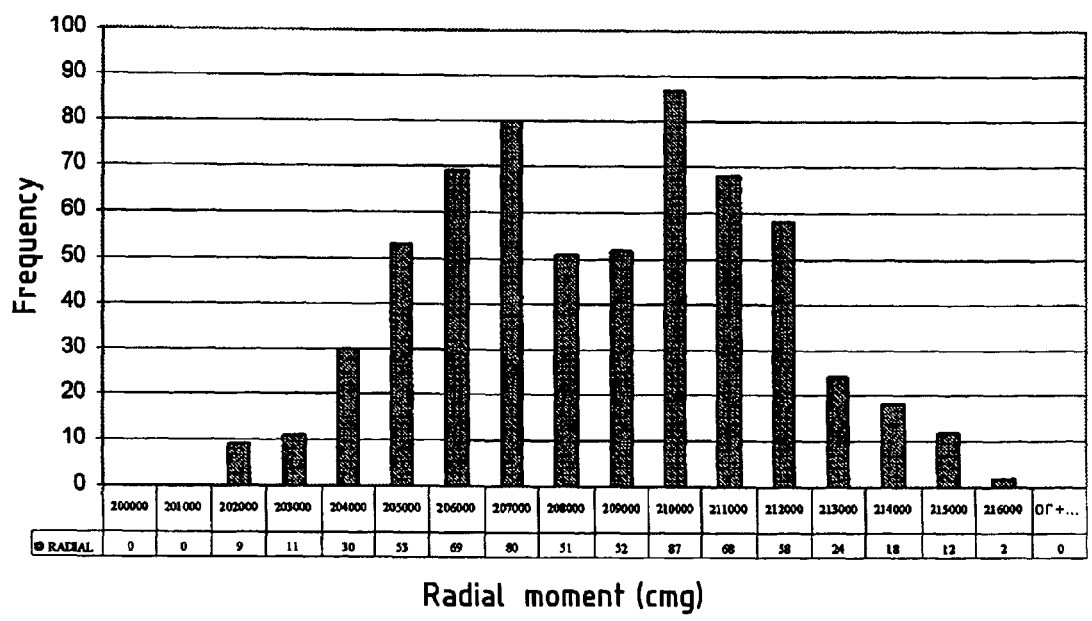
Figure 5A:
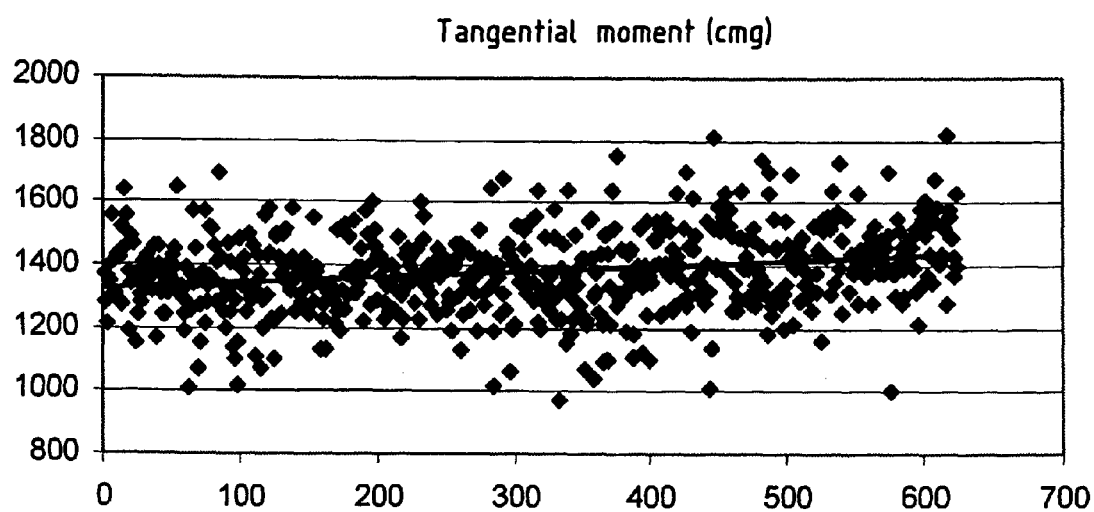
Figure 5B:
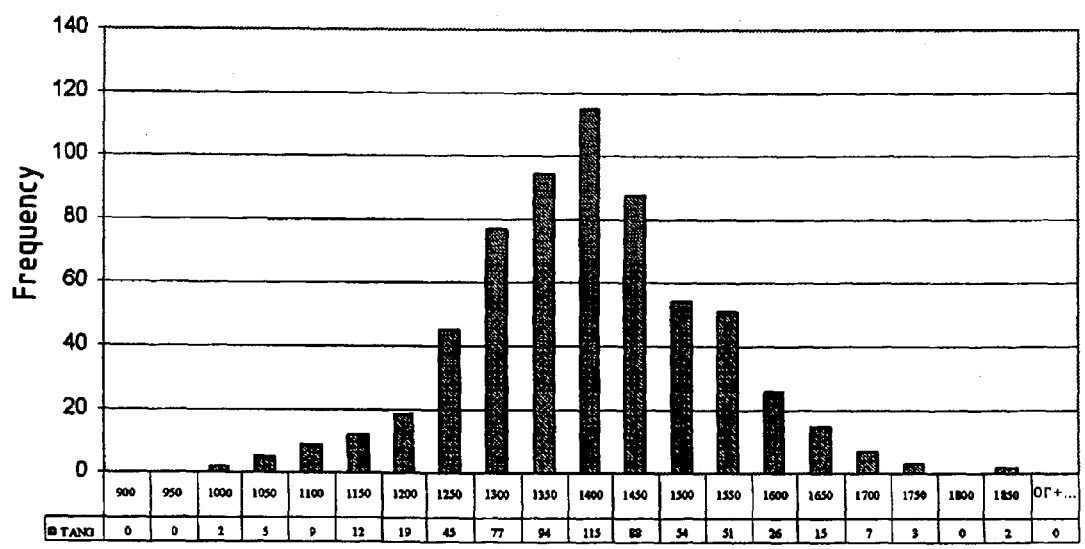
Figure 6A:
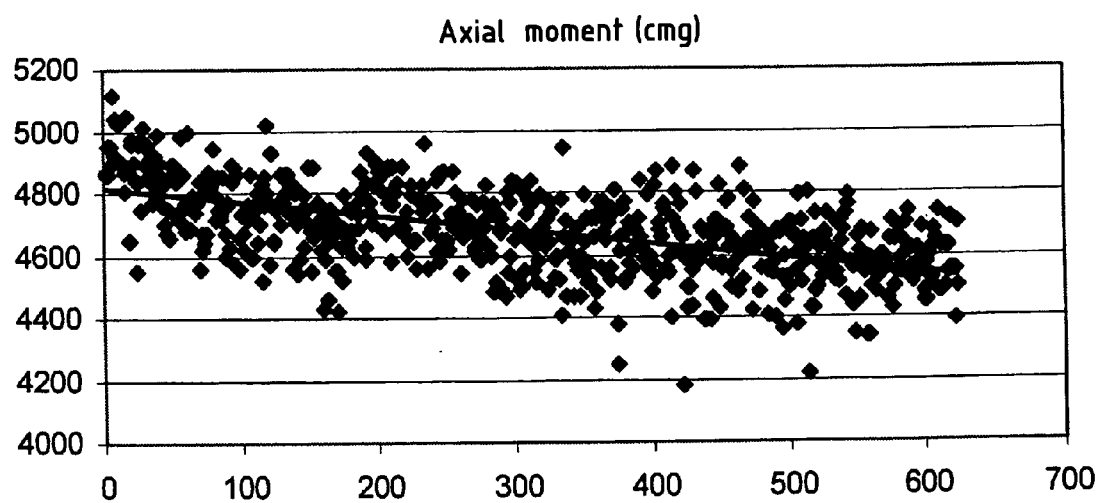
Figure 6B:
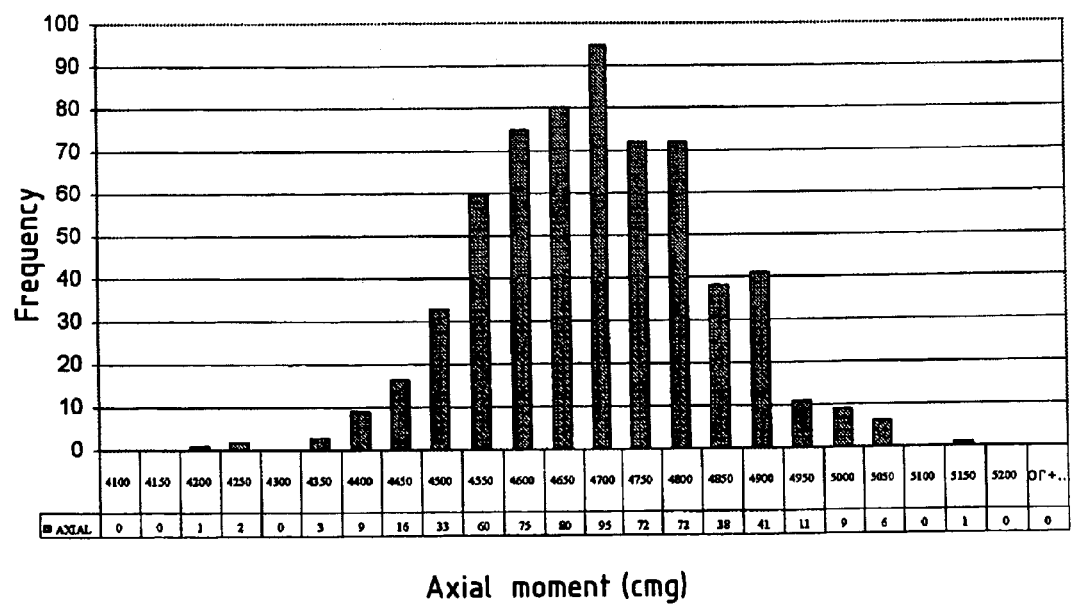

FIG. 4A shows the value of the various radial static moments measured for each of the blades in these 26 sets. In the example shown, these moments vary in the range 201,000 cm.g to 215,000 cm.g. The distribution of these moments in terms of their values is plotted in FIG. 4B. Similarly, FIG. 5A gives the values of various tangential static moments measured for each of the blades in the various sets. These moments vary in the range 950 cm.g to 1850 cm.g. The distribution of these moments in terms of their values is plotted in FIG. 5B. FIG. 6A gives the value of the various axial static moments measured for each of the blades in the various sets. These moments vary in the range 4150 cm.g to 5150 cm.g. The distribution of these moments in terms of their values is plotted in FIG. 6B.

It is then possible to classify these blades in pairs so that each occasion the difference in radial static moment is less than the first predetermined value, i.e. 200 cm.g in this example, and the difference in tangential static moment is less than the second predetermined value, i.e. 300 cm.g in this example, with the difference in axial static moment being less than the third predetermined value, i.e. in this example likewise 300 cm.g. This leads to the following table:

| Blade pair No. | Radial SM difference | Axial SM difference | Tangential SM difference |
| --- | --- | --- | --- |
| 1 (blades 1 & 13) | 20 | 100 | 70 |
| 2 (blades 2 & 14) | 60 | 120 | 110 |
| 3 (blades 3 & 15) | 100 | 270 | 280 |
| 4 (blades 4 & 16) | 20 | 250 | 140 |
| 5 (blades 5 & 17) | 30 | 170 | 220 |
| 6 (blades 6 & 18) | 60 | 80 | 60 |
| 7 (blades 7 & 19) | 30 | 0 | 140 |
| 8 (blades 8 & 20) | 50 | 210 | 260 |
| 9 (blades 9 & 21) | 80 | 100 | 30 |
| 10 (blades 10 & 22) | 140 | 150 | 110 |
| 11 (blades 11 & 23) | 60 | 170 | 40 |
| 12 (blades 12 & 24) | 60 | 160 | 240 |

Figure 7B:
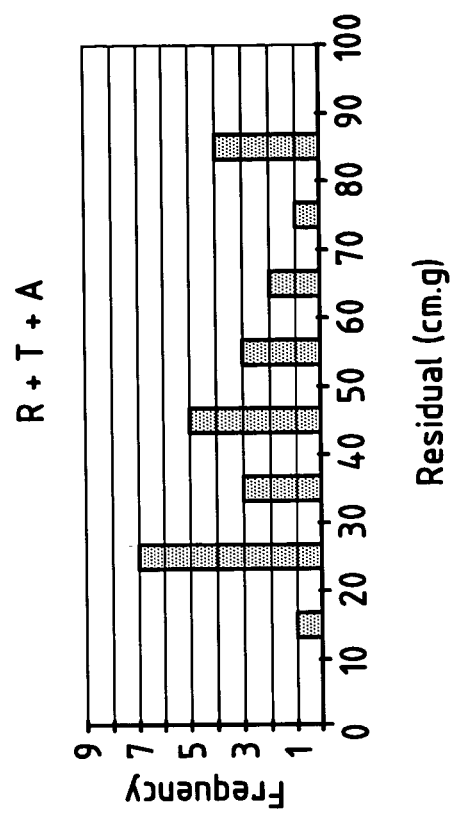
Figure 7A:
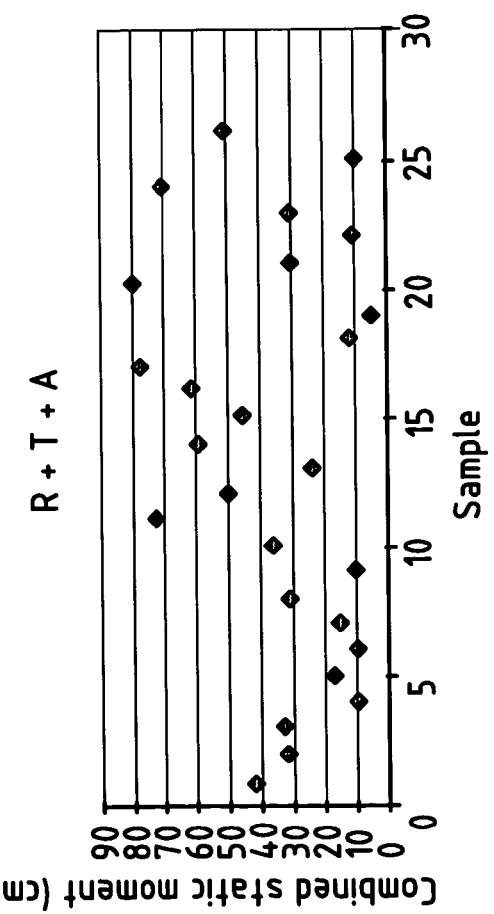

Preferably, it is then ensured that the radial (R)+tangential (T)+axial (A) resultant of the unbalance of the full set of blades (also referred to as the blading unbalance) is less than a fourth determined value which is equal to 100 cm.g in this 24-blade example. FIG. 7A gives the values of the various combined static moments (R+T+A) as measured for each of the 26 sets. These moments vary in the range 11 cm.g to 80 cm.g, so they are indeed less than 100 cm.g. The distribution of these residual moments in terms of their values is shown in FIG. 7B. It should be observed that in the event of this blading unbalance departing from the authorized limit value, it is necessary to resort to permutations or changes of pairs in order to find a value that is more compatible with the required limit.

In the above example, the 26 sets of 24 blades were distributed on the basis of 3D static moments, however it is also possible under less favorable circumstances to proceed on the basis of the radial and tangential static moments only. Under such circumstances, the resultant blading unbalance should be verified on the basis of the radial+tangential (R+T) resultant of the static moment alone.

The method of the invention as described for a set of 24 blades is naturally also applicable to an arbitrary number of blades forming a subset of the blades that are regularly distributed around the circumference of a turbomachine rotor.

What is claimed is:

1. A method of distributing the blades of a turbomachine rotor in which radial and tangential static moments of a plurality of blades are initially measured, and then the blades are classified in pairs on the basis of a determined selection criterion depending on said previously measured two static moments, and finally the blades of the selected pairs are mounted one by one on the rotor in diametrically opposite positions, wherein said selection criterion comprises determining for two given blades both a radial static moment difference and a tangential static moment difference, and verifying that said radial static moment difference is not greater than a first determined value and that said tangential static moment difference is not greater than a second determined value.

2. A method of distributing the blades of a turbomachine rotor according to claim 1, wherein said first determined value is $2\times10^{-4}$ m.kg.

3. A method of distributing the blades of a turbomachine rotor according to claim 1, wherein said second determined value is $4 \times 10^{-4}$ m.kg.

4. A method of distributing the blades of a turbomachine rotor according to claim 1, wherein an axial static moment of said plurality of blades is measured and the blades are classified in pairs while taking account of the axial static moment.

5. A method of distributing the blades of a turbomachine rotor according to claim 4, wherein a combined static moment of said plurality of blades is calculated and the classification in pairs is performed while taking account of the combined static moment.

6. A method of distributing the blades of a turbomachine rotor according to claim 5, wherein said selection criterion comprises determining an unbalance of a residual radial, tangential, and axial static moments of said plurality of blades and verifying that the unbalance is not greater than a fourth determined value.

7. A method of distributing the blades of a turbomachine rotor according to claim 6, wherein said fourth determined value is $1 \times 10^{-4}$ m.kg.

8. A method of distributing the blades of a turbomachine rotor according to claim 1, wherein an axial static moment of said plurality of blades is measured and the blades are classified in pairs while taking account of the axial static moment, and wherein said selection criterion comprises determining an axial static moment difference between said two blades and verifying that the axial static moment difference is not greater than a third determined value.

9. A method of distributing the blades of a turbomachine rotor according to claim 8, wherein said third determined value is $4 \times 10^{-4}$ m.kg.

* * * * *